United States Patent
Gapontsev et al.

(10) Patent No.: US 8,948,218 B2
(45) Date of Patent: Feb. 3, 2015

(54) HIGH POWER FIBER LASER SYSTEM WITH DISTRIBUTIVE MODE ABSORBER

(71) Applicant: IPG Photonics Corporation, Oxford, MA (US)

(72) Inventors: Valentin Gapontsev, Worcester, MA (US); Valentin Fomin, Burbach (DE); Mikhail Abramov, Burbach (DE); Anton Ferin, Burbach (DE)

(73) Assignee: IPG Photonics Corporation, Oxford, MA (US)

( * ) Notice: Subject to any disclaimer, the term of this patent is extended or adjusted under 35 U.S.C. 154(b) by 0 days.

(21) Appl. No.: 14/308,407

(22) Filed: Jun. 18, 2014

(65) Prior Publication Data

US 2014/0362877 A1    Dec. 11, 2014

(51) Int. Cl.
*H01S 3/30* (2006.01)
*H01S 3/067* (2006.01)
*G02B 6/036* (2006.01)
*G02B 6/14* (2006.01)

(52) U.S. Cl.
CPC ............ *H01S 3/06708* (2013.01); *G02B 6/036* (2013.01); *G02B 6/14* (2013.01)
USPC .............................................................. 372/6

(58) Field of Classification Search
USPC .............................................................. 372/6
See application file for complete search history.

(56) References Cited

U.S. PATENT DOCUMENTS

| | | | | |
|---|---|---|---|---|
| 5,336,883 A | * | 8/1994 | Hobby et al. | 250/227.17 |
| 2008/0219299 A1 | * | 9/2008 | Lewis | 372/6 |
| 2010/0303104 A1 | * | 12/2010 | Bennetts et al. | 372/6 |

* cited by examiner

*Primary Examiner* — Kinam Park
(74) *Attorney, Agent, or Firm* — Yuri Kateshov, Esq.; Timothy J. Kivg, Esq.

(57) ABSTRACT

A clad absorber unit is provided on a passive fiber of a high power fiber laser system and operative to trap and remove modes propagating along the waveguide clad of the fiber. The mode absorber is configured with such an optimal length that the clad light may be removed in a localized manner, substantially uniformly removed over the entire length thereof. The absorber removing clad light in a unformed fashion includes a host material impregnated with diffusers.

29 Claims, 2 Drawing Sheets

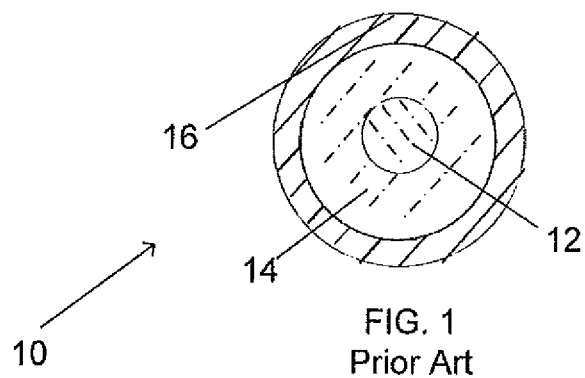
FIG. 1
Prior Art
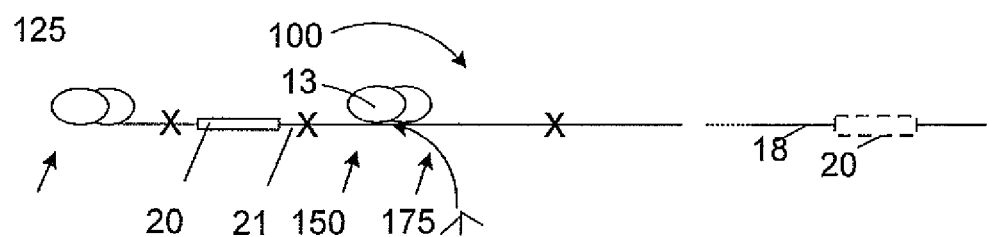
FIG. 2
FIG. 3
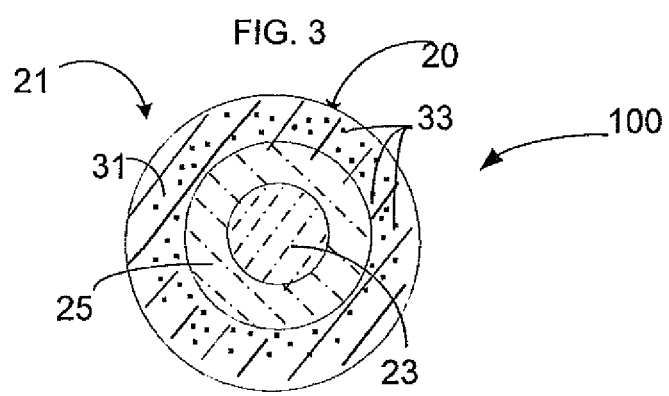

HIGH POWER FIBER LASER SYSTEM WITH DISTRIBUTIVE MODE ABSORBER

BACKGROUND OF THE DISCLOSURE

1. Field of Disclosure

The disclosure relates to high power fiber laser systems. In particular, the disclosure relates to a fiber provided with clad mode absorber operative to decouple undesirable light guided in a cladding.

2. Prior Art

High power fiber laser systems ("HPFLS"), are typically configured with one or more amplifying cascades each including an active fiber which is either side or end pumped by multimode (MM) pump light. The latter is not always fully absorbed and continues to propagate along the fiber's inner cladding under a polymeric protective sheath which has a lower refractive index than that of quartz. With increased powers of current pump sources, it is not unusual that this residual pump light guided in the cladding reaches kW levels. Fibers experience bends and other mechanical stresses leading to micro distortions guiding undesirable kW clad light towards the sheath that can be easily damaged.

Still another source of undesired clad light that may destroy a protective sheath includes splice regions between fibers. Spliced fibers are not always uniformly dimensioned and/or not perfectly spliced together which create favorable conditions for excitation of MM light in splice regions. This undesirable light is also guided along the cladding and adds to already high power of unabsorbed pump light. Also, high power light back reflected from the laser treated surface may be coupled in the cladding and thus contribute to high powers that may heat the protective sheath up to critical temperatures.

Furthermore, in high power SM fiber laser systems, the MM radiation guided in the cladding may damage the end regions of the fiber. Finally, the presence of the MM light at the output end of single mode delivery fibers in high power SM laser systems affects the quality of the SM signal light. Based on the foregoing, MM clad light is highly undesirable and should be removed.

Referring to FIG. 1, typically, a high power fiber laser system is configured with a passive fiber 10 located downstream from amplifying gain blocks and delivering amplified signal light to the surface to be treated by the signal light. The fiber 10 includes a core 12 guiding the signal light, a wave guiding cladding 14 supporting undesirable MM clad light and a polymeric protective sheath 16 preventing the MM light from escaping cladding 14. Optionally, delivery fiber 10 may also have an outer cladding with a refractive index lower than that one of cladding 14. As discussed above, the MM light guided along waveguide cladding 14 is highly undesirable, hazardous and therefore should be decoupled from waveguide cladding 14.

Devices configured to remove clad light and convert the light energy into heat energy are known as, among others, cladding mode absorbers or strippers ("CMA" or "CMS") Typically, a CMS is provided along a length of one or more passive fibers, for example, a delivery fiber which is stripped from the protective sheath 18 and configured with a higher refractive index than that one of quartz, i.e. wave guiding cladding 14.

Some of structural limitations of known CMSs include a low thermal conductivity which leads to localized removal of high power clad light. The known silicone absorbers typically allow decoupling cladding light with a power varying from about 100 to about 400 W, which is considered to be not particularly damaging to silicone and/or other optical components. Yet this power range tolerance is insufficient for modern multi-kW high power fiber systems in which localized removal of powers higher than about 400 W may heat a CMS at temperatures that can easily damage the CMS and other optical components.

Also, the MM light includes both high numerical aperture ("NA") light and low NA light. The high NA light propagates at relatively large angles and may be easily absorbed. However, low NA light propagating at angles of up to about 45° is rarely absorbed and thus continues its propagation almost unabsorbed. Reaching the system output, the unabsorbed MM light considerably worsens the quality of the output signal light.

A need therefore exists for a high power CMS used in conjunction with high power fiber laser systems and configured to maximize decoupling of MM clad light from a waveguide cladding.

Another need exists for a CMS configured to provide substantially uniformly distributed absorption of clad light along its entire length.

Yet another need exists for a high power CMS having a high-temperature resistant structure.

SUMMARY OF THE DISCLOSURE

These and other needs are satisfied by the disclosed clad mode stripper ("CMS"). The CMS is configured with such an optimized length that temperatures, which are reached at a maximum dissipated light power of the removed clad light, do not exceed the desired safe level.

In accordance with one aspect of the disclosure, a silicone-based CMS is configured with such a length that a substantially uniform distribution of MM light removal from a waveguide cladding along the length of the CMS is attained. The realization of such an optimized structure of the disclosed CMS includes impregnating silicone-based host material with particles of aluminum oxide ("$Al_2O_3$").

The host material is provided with a refractive index lower than that one of the inner cladding and thus confines MM light to the waveguide cladding. However, the particles are distributed in the volume of the host material so as to periodically come into contact with guided MM light and gradually scatter the latter. The scattered MM light propagates along numerous directions including those within the host material. Accordingly, every time clad light comes into contact with the particles, a part of the scattered MM light remains in the host material. However, the maximum dissipated light power of this light part that remains in the host material is such that temperatures at which the host material heats are always lower than a predetermined threshold temperature known to damage the host material. The desired concentration of the particles is selected so as to provide an optimal length of CMS over which the distribution of MM light removal is substantially uniform while the CMS is heated at temperatures not exceeding the threshold.

In accordance with a further aspect of the disclosure, the CMS is configured, at least partially, along a tapered transition region of fiber. The concentration of the particles and cone angle of the transition region are so selected that both high numerical aperture ("NA") modes and low NA modes are substantially fully and uniformly removed from the waveguide cladding along the optimally dimensioned CMS. The maximum dissipating light power of the scattered light along the optimal length of the CMS heats the host material at temperatures lower than a threshold temperature.

BRIEF DESCRIPTION OF THE DRAWINGS

The above and other features and advantages of the disclosed CMS will become more readily apparent with the following drawings, in which:

FIG. 1 is a cross-sectional view of a prior art fiber configuration provided with a CMS;

FIG. 2 is a diagrammatic view of high power fiber laser system ("HPFLS") provided with the disclosed clad mode absorber ("CMS");

FIG. 3 is a cross-sectional view of the disclosed CMS;

SPECIFIC DESCRIPTION

Figure 4:
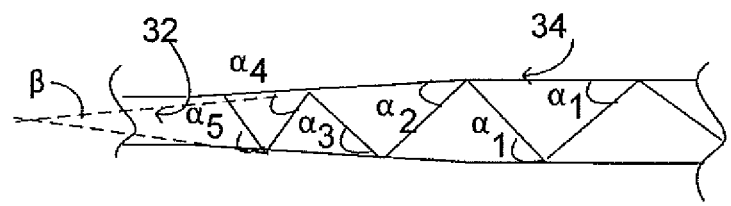
FIG. 4 is a diagrammatic view of a fiber disclosed in accordance with one of the aspects of the present disclosure.

Reference will now be made in detail to the disclosed mode clad absorber and high power fiber laser system incorporating the absorber. Wherever possible, same or similar reference numerals are used in the drawings and the description to refer to the same or like parts or steps. The drawings are in simplified form and are far from precise scale. For purposes of convenience and clarity only, directional terms may be used with respect to the plane of the drawing sheets and not to be construed to limit the scope. Unless specifically noted, it is intended that the words and phrases in the specification and claims be given the ordinary and accustomed meaning to those of ordinary skill in the fiber laser arts. The disclosed fiber system may be configured as a SM system or a MM system and operate in pulsed and/or continuous wave regimes.

FIG. 2 illustrates a diagrammatic view of high power fiber laser system 100 which, for example, is configured as a master oscillator power amplifier ("MOPA") configuration with a master oscillator 125, an amplifier 150 and at least one pump 175. The latter emits pump light which is coupled into amplifier 150 in a direction counter to that one of a forward-propagating signal light which may be, for example, radiated in a single mode ("SM") or multiple modes ("MM") downstream from amplifier 150 at high power levels. Of course, system 100 may include a variety of configurations with any number of oscillators and/or amplifiers which varies between a single device and multiple fiber devices.

As shown, a typical gain block, whether it is amplifier 150 or oscillator 125, is configured with an active fiber 13 doped with rare-earth ions, and two passive fibers spliced to respective ends of active fiber 13. The amplifier 150, for example, amplifies signal light which is guided along system 100 via a delivery passive fiber 18 towards the surface to be laser treated. A clad mode stripper ("CMS") 20 may be provided at any convenient part of system 100. For example, it may be provided along delivery fiber 18. Alternatively or in addition to fiber 18, CMS 20 may be provided along a passive fiber 21 coupled between the gain blocks of system 100 and "cleaning" the waveguide cladding of fiber 21 from unabsorbed pump light from pump 175.

FIG. 3 illustrates a cross-section of passive fiber 21 configured with a stretch of its periphery which has CMS 20. The fiber 21 includes concentrically configured core 23, inner waveguide cladding 25 and a protective sheath. As known by one of ordinary skill in the laser arts, a part of sheath is removed to provide a volume for CMS 20. Optionally, fiber 21 may have a reflective cladding, not shown here.

In accordance with one aspect of the disclosure, CMS 20 includes an elastic host material 31 surrounding cladding 25 and having the refractive index lower than that of this cladding. However, silicon host material 31, for example, Silicone Gel contains a plurality of additives 33, such as particles/diffusers/additives of aluminum oxide $Al_2O_3$ distributed in the volume of host material 31 which includes the interface between cladding 25 and host material 31. These additives 33 do not absorb light, but scatter it. Scattering is typically omni-directional which, at contact points between light and particles 33, leaves some light within host material 31.

The concentration and distribution of particles 33 are selected to provide a substantially uniform removal of the MM light from cladding 25 along a length of absorber 20. The lengths thus so dimensioned that the substantially uniform removal of MM light occurs at maximum dissipating light powers heating the CMS at temperatures below a predetermined thermal threshold known to be damaging to the absorber and other optical components of system 100.

Generally, the size of particles 33 may affect a refractive index of CMS 20 if the particles are reduced to the a smaller size than the wavelength of the MM light. Once the refractive index of CMS 20 is altered, i.e., increased to be higher than that one of cladding 25, the scattering of MM clad light may become unidirectional.

FIG. 4 illustrates a further aspect of the disclosure related to different angles of propagation of multiple clad modes. As known, MM light propagating along a cladding of fiber 25 may have modes with relatively large numerical aperture ("NA") and modes with relatively small NA. When light propagates along a fiber with uniform cross-section such as a region 34, the reflection angle $\alpha 1$ remains constant. The large NA modes can easily come into contact with the outer periphery of the fiber basically along an initial stretch of light path and be removed. However low NA modes may not come in contact with the periphery at all along region 34.

In accordance with this aspect of the disclosure, the fiber is configured with a tapered transition region 32. As shown, once light comes into contact with the surface of the tapered or transition region 32, it bounces off at progressively increasing angle $\alpha$ as long as light propagates through the transition region. In other words, the angle $\alpha 1 < \alpha 2 < \alpha 3 < \alpha 4 < \alpha 5$ and so on.

Figure 5:
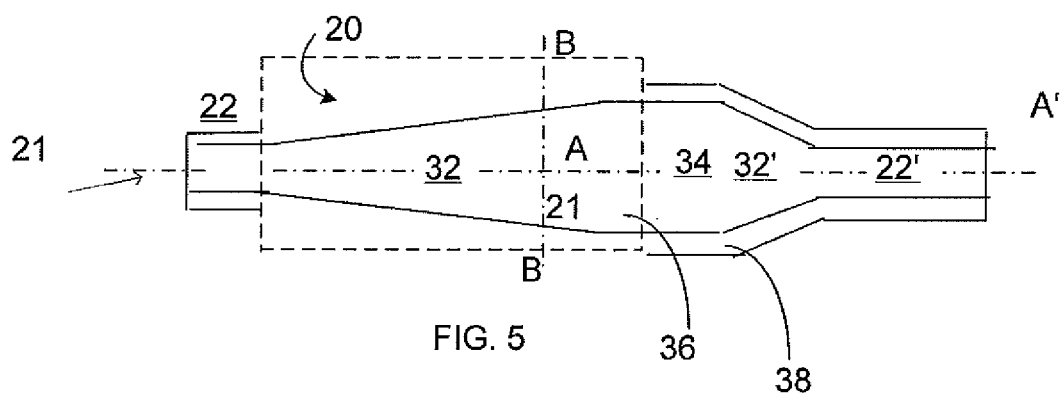
FIG. 5 is a diagrammatic view of the fiber of FIG. 4 provided with the disclosed CMS of FIG. 3.

Referring to FIG. 5 in addition to FIG. 4, tapered region 32 is configured with a cone angle $\beta$ selected to provide CMS 20 with an optimal length along which the undesired MM light is substantially uniformly removed at maximum dissipating powers lower than the thermal threshold for a given host material of CMS 20. In other words, a thermal load along the CMA is smooth although high NA light is removed from the fiber along an upstream, initial stretch of light path, whereas low NA light is constantly transformed by the cone to progressively higher NAs until it is removed along the downstream stretch of the light path extending through tapered region 32.

Referring specifically to FIG. 5, one of the preferred configurations of passive fiber 21 includes opposite end regions 22 and 22', respectively, each having a uniform relatively small diameter. The end regions may or may not be uniformly configured depending on the local requirement for system 100. The fiber 21 is further configured with two tapered or transitional regions 32 and 32', respectively, and central region 34 which has a diameter larger than the end regions. In general the cross-section of fiber 21 of FIG. 5 is referred to as a twin bottle-shaped longitudinal cross-section taken along a longitudinal axis A-A'.

The CMS 20 may be provided between end and central regions 22 and 34, respectively, and may terminate within these regions. For example, to minimize the edge of coating 38 from burning, its portion is stripped, for example, along about 20 cm of central region 34 and further along entire tapered region 32. After that, the thus provided opening is filled, for example, with the compound mass including of up to about 60 percent of additives 33. Thereafter, CMA 20 may be placed in a gain block's housing with ~50 cm bending diameter. The thus configured CMS has been tested to safely operate at temperatures above 120° C. The location of CMS 20 may be altered and include substantially only transition region 32.

Based on the foregoing, a maximal level of dissipated light power depends on the CMA's length. The particles/diffusers concentration in the silicone material and cone angle of the tapered region are selected so that the host material is heated at safe temperatures at maximal dissipated power levels. Varying two parameters—diffuser concentration and cone angle of the transient area—allows a substantially uniform removal and subsequent emission of the undesired multiple clad modes, including both high and low numerical apertures, at maximum possible power levels.

Figure 6:
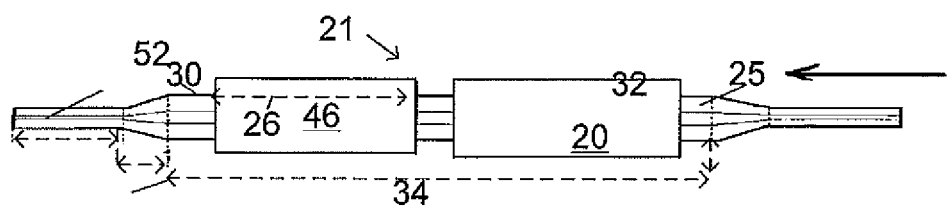
FIG. 6 is a diagrammatic view of a fiber provided with a combination of absorbers including the disclosed CMS.

Referring to FIG. 6, fiber 21 may be provided with two or more CMS 20 and 46, respectively. As discussed above, fiber 21 includes core 52, at least one or multiple claddings 25 and protective sheath 30. The CMS 46 may be a traditional silicone absorber with a substantially localized emission. To protect absorber 46 and other optical components, the dissipated power should not generate temperatures above the thermal threshold. Accordingly, it is possible to configure fiber 21 with disclosed absorber 20 which is operative to remove the larger portion of the MM clad in a safe and efficient manner leaving thus just a fraction of the entire MM light that is effectively removed downstream from CMS 20 by absorber 46 at desired relatively low temperatures.

A variety of changes of the disclosed structure may be made without departing from the spirit and essential characteristics thereof. Thus, it is intended that all matter contained in the above description should be interpreted as illustrative only and in a limiting sense, the scope of the disclosure being defined by the appended claims.

The invention claimed is:

1. A clad mode stripper ("CMS") unit for a high power fiber laser system, comprising:
a passive fiber configured with a core, at least one waveguide cladding surrounding the core, and a polymeric sheath coated upon the cladding and having a discontinuous surface which defines an opening terminating in a plane of the cladding; and
a clad mode stripper ("CMS") filling the opening so as to cover an exposed portion of the cladding, the CMS being configured to provide a substantially uniform removal of a multimode ("MM") light from the cladding along an entire length of the CMS at a maximum dissipated light power heating the CMS at a temperature lower than a thermal threshold at which the CMS is damaged.

2. The CMS unit of claim 1, wherein the CMS includes a host material with a refractive index lower than that one of the cladding and a plurality of diffusers impregnated in the host material and scattering the MM light, which is incident upon the CMS, so that a removal of the MM is substantially uniformly distributed along the entire length of the CMS.

3. The CMS unit of claim 2, wherein the diffusers are impregnated at a concentration selected to provide the CMS with the entire length which is optimally dimensioned to provide the uniform MM light removal from the cladding along the length at the maximum dissipated power.

4. The CMS unit of claim 1, wherein the host material includes silicone, and the diffusers include aluminum oxide particles.

5. The CMS unit of claim 2, wherein the passive fiber has adjacent central uniformly dimensioned and tapered regions, the tapered region at least partially coextending with the CMS and having a cone angle selected so as to provide the CMS with the entire length so optimally dimensioned that the removal of the MM light is substantially uniformly distributed along the length at the maximum dissipated power.

6. The CMS unit of claim 5, wherein the passive fiber further has first and second end regions with the first region adjoining the one tapered region, and another tapered region bridging the second end region and central region, the CMS extending between the uniformly dimensioned central and first end regions.

7. The CMS unit of claim 6, wherein the first and second regions each have a cross-section smaller than that one of the central region, the first and second end regions having a uniform configuration or different configurations, and the tapered regions being uniformly or non-uniformly configured.

8. The CMS unit of claim 7, wherein the one tapered region is longer than the other tapered region.

9. The CMS unit of claim 5, wherein the cone angle is selected so that that the CMS is operative to remove low numerical aperture modes of the MM light.

10. The CMS unit of claim 1 further comprising an absorber located downstream from the CMS and operative to locally remove a remaining portion of the MM light not stripped by the CMS.

11. A method of manufacturing a clad mode absorber unit for a fiber laser system having a plurality of passive fibers each of which is configured with a core, at least one cladding surrounding the core and capable of guiding an undesired multimode ("MM") light, and a polymeric sheath upon the cladding; the method comprising:
removing a portion of the sheath at a desired location, thereby forming an opening in the sheath so as to expose a length of the cladding; and
configuring a clad mode stripper ("CMS") with an optimal length dimensioned so that, upon being applied to the cladding within the opening, the CMS is operative to substantially uniformly remove the MM along the optimal length thereof at a maximum dissipated light power lower than a thermal threshold at which the CMS is damaged.

12. The method of claim 11, wherein configuring of the CMS includes:
providing a host material with a refractive index lower than that one of the cladding;
impregnating the host material with light scattering diffusers, and
selecting a concentration of the diffusers so as to provide the CMS with the optimal length over which the diffusers substantially uniformly scatter the MM light at the maximum dissipating light power.

13. The method of claim 12, wherein the host material includes silicone and the scattering diffusers include $AL_2O_3$ particles.

14. The method of claim 11, wherein providing the passive fiber includes drawing the core and cladding with a uniformly configured central region and at least one tapered region running from one end of the central region at a desired cone angle is selected to provide the CMS with the optimal length.

15. The method of claim 14, wherein the cone angle is selected to increase an angle of low numerical aperture ("LNA") modes of the MM light to a desired angle at which the LNA modes are removed from the cladding.

16. The method of claim 14, wherein providing the passive fiber includes drawing the core and cladding with first and second spaced end regions with the first end region adjoining the one tapered region, and another tapered region bridging the second end and central end regions, the end regions each having a substantially uniform cross-section smaller than that one of the central region.

17. The method of claim 16, wherein the protective sheath is removed between the central and first end regions so that the CMS extends along the one tapered region either over a full length thereof or a portion thereof.

18. A high power fiber laser system, comprising:
at least one gain block operative to emit a high power radiation;
a plurality of passive fibers optically coupled to the gain block, the passive fiber each having a core, at least one cladding surrounding the core and configured to guide multimode ("MM") light, and a sheath upon the cladding, at least one of the passive fibers having a part of the sheath removed so as to expose the cladding;
a clad mode stripper ("CMS") applied to the exposed cladding and configured to provide a substantially uniform removal of the MM light from the cladding along an entire length of the CMS at a maximum dissipated light power heating the CMS at a temperature lower than a thermal threshold at which the CMS is damaged.

19. The high power fiber laser system of claim 18 further comprising an additional gain block and at least one pump configured to pump the one gain block in a direction counter to a direction of propagation of signal light, the gain blocks defining a MOPA configuration, wherein the one gain block is configured as a SM power amplifier and the additional gain block includes a SM master oscillator, the passive fiber configured with CMS being a delivery fiber or a fiber between one and additional gain block.

20. The high power system of claim 18 wherein the gain block is operative to emit pulsed high power radiation or continuous high power radiation, the radiation being emitted in a single mode or multiple modes.

21. The high power system of claim 18, wherein the CMS includes a host material with a refractive index lower than that one of the cladding and a plurality of diffusers impregnated in the host material to scatter the MM light incident upon the CMS so that a removal of the MM is substantially uniformly distributed along the entire length of the CMS.

22. The high power system of claim 21, wherein the diffusers are impregnated at a concentration selected to provide the CMS with the entire length which is optimally dimensioned to provide the uniform MM light removal from the cladding along the length at the maximum dissipated power.

23. The high power system of claim 21, wherein the host material includes silicone, and the diffusers include aluminum oxide particles.

24. The high power system of claim 21, wherein the diffusers each are dimensioned so as to provide a substantially unidirectional scattering of the MM light into the host material.

25. The high power system of claim 19, wherein the passive fiber has adjacent central uniformly dimensioned and tapered regions, the tapered region at least partially coextending with the CMS and having a cone angle selected so as to provide the CMS with the entire length so optimally dimensioned that the removal of the MM light is substantially uniformly distributed along the length at the maximum dissipated power.

26. The high power system of claim 25, wherein the passive fiber further first and second end regions with the first region adjoining the one tapered region, and another tapered region bridging the second end region and central region, the CMS extending between the uniformly dimensioned and first end regions.

27. The high power system of claim 26, wherein the first and second end regions each have a cross-section smaller than that one of the central region, the first and second end regions having a uniform configuration or different configurations, and the tapered regions being uniformly or non-uniformly configured.

28. The high power system of claim 26, wherein the one tapered region is longer than the other tapered region.

29. The high power system of claim 25, wherein the cone angle is selected so that that the CMS is operative to remove low numerical aperture modes of the MM light.

* * * * *